US011142017B2

(12) United States Patent
Ramos-Dones

(10) Patent No.: US 11,142,017 B2
(45) Date of Patent: Oct. 12, 2021

(54) VISUAL AIDING ORGANIZATIONAL NOTEBOOK AND PERFORMANCE-BASED REWARD SYSTEM AND METHOD FOR STUDENTS

(71) Applicant: Frances Marie Ramos-Dones, San Juan, PR (US)

(72) Inventor: Frances Marie Ramos-Dones, San Juan, PR (US)

( * ) Notice: Subject to any disclaimer, the term of this patent is extended or adjusted under 35 U.S.C. 154(b) by 0 days.

(21) Appl. No.: 16/733,837

(22) Filed: Jan. 3, 2020

(65) Prior Publication Data

US 2020/0139746 A1 May 7, 2020

Related U.S. Application Data

(63) Continuation-in-part of application No. 16/381,669, filed on Apr. 11, 2019, now abandoned, which is a continuation of application No. 15/907,862, filed on Feb. 28, 2018, now abandoned, which is a continuation-in-part of application No. 13/165,843, filed on Jun. 22, 2011, now abandoned, which is a continuation-in-part of application No. 12/656,243, filed on Jan. 21, 2010, now abandoned.

(51) Int. Cl.
| | |
|---|---|
| *B42F 21/00* | (2006.01) |
| *B42F 7/06* | (2006.01) |
| *B42D 5/04* | (2006.01) |
| *B42D 15/00* | (2006.01) |
| *G09B 1/00* | (2006.01) |
| *G09B 19/00* | (2006.01) |
| *B42D 1/00* | (2006.01) |
| *B42D 9/00* | (2006.01) |
| *B42F 19/00* | (2006.01) |
| *B42D 3/00* | (2006.01) |

(52) U.S. Cl.
CPC .............. *B42F 21/00* (2013.01); *B42D 5/047* (2013.01); *B42D 15/0046* (2013.01); *B42F 7/06* (2013.01); *G09B 1/00* (2013.01); *G09B 19/00* (2013.01); *B42D 1/001* (2013.01); *B42D 3/006* (2013.01); *B42D 9/004* (2013.01); *B42F 19/00* (2013.01); *B42P 2221/04* (2013.01)

(58) Field of Classification Search
CPC . B42F 21/00; B42F 7/06; B42F 19/00; B42D 5/047; B42D 15/0046; B42D 1/001; B42D 9/004; B42D 3/006; B42D 5/04; G09B 1/00; G09B 19/00; B42P 2221/04
USPC ...... 281/2, 3.1, 15.1, 16, 38; 283/48.1, 52.1, 283/63.1, 64.1, 66.1, 67, 70, 72, 74, 75, 283/115; 434/155, 365, 430
See application file for complete search history.

(56) References Cited

U.S. PATENT DOCUMENTS 5,743,746 A * 4/1998 Ho ........................... G09B 5/14
434/332

* cited by examiner

*Primary Examiner* — Justin V Lewis
(74) *Attorney, Agent, or Firm* — Eugenio J. Torres-Oyola; Victor M. Rodriguez-Reyes; Rafael Rodriguez-Muriel

(57) ABSTRACT

A system of notebooks that are color-coded to relate to a particular class or subject. For example, a green notebook could relate to a Science class, a red notebook could relate to Math, etc. The notebooks are fashioned to employ different calligraphy. The system further includes control articles such as an agenda to track student progress using indicia and give rewards to the student for achieving predetermined milestones. The indicia correlates sections in the control article (agenda) with the notebooks or other items. Said indicia visually aids students, parents and teachers to track the student's progress and creating a habit of having an organized schedule for school.

15 Claims, 21 Drawing Sheets

FIG. 17

VISUAL AIDING ORGANIZATIONAL NOTEBOOK AND PERFORMANCE-BASED REWARD SYSTEM AND METHOD FOR STUDENTS

RELATED APPLICATIONS

The present application is a continuation-in-part of U.S. application Ser. No. 16/381,669 filed on Apr. 11, 2019, which is a continuation-in-part of U.S. application Ser. No. 15/907,862 filed on Feb. 28, 2018, which is a continuation-in-part of U.S. application Ser. No. 13/165,843 filed on Jun. 22, 2011, which is a continuation in part of U.S. application Ser. No. 12/656,243 filed on Jan. 21, 2010.

STATEMENT REGARDING FEDERALLY SPONSORED RESEARCH AND DEVELOPMENT

N/A

BACKGROUND OF THE INVENTION

Field of the Invention

The present invention is generally directed to organizational system and kit, and more particularly, to a group of articles linked to an organization unit for use in educational systems and institutions that enable students to develop organization skills, offering rewards to students as an incentive for good performance based on parameters determined by teachers, and motivating and reinforcing positive behaviors.

Discussion of the Background

Some health specialists recommend several organization tools in order to be more successful at work, assist people with brain or memory deficits, maximize academic experience and more. Students deserve the best academic experience that will enable them to build a better future. It is crucial to provide students—without distinction of their educational methods—with the tools that will help them maximize their potential.

Acquiring good study habits is essential to academic success. One aspect of acquiring such habits is that of organization and creating structured plans. Students at the elementary level and those suffering from different variations of cognitive abilities such Attention Deficit Disorder and Attention Deficit/Hyperactivity Disorder (ADD/ADHD) usually lack organizational skills. Also, it should be noted that children with autism need a more structured and organized environment. The lack of organization translates into disarray in their lockers, desks, notebooks, etc. Often, the student brings the wrong notebook home or to the classroom for a particular class, further exacerbating the learning process and negatively affecting school performance. Most experts agree that organizational skills are learned rather than inherited. It is also agreed that the earlier these skills are learned and developed the better the student's chances for success (not only in an academic environment but also in life).

Psychologists and child/teenager specialists strongly advocate the use of color, as a form of indicia to be used as a medium to raise a child's or teenager's attention level. Teachers and parents, especially in the elementary grades, have utilized various methods (stickers, numbers, color markers, etc.) to mark and differentiate notebooks for organizational purposes. Since everyone uses a different method, there is no continuity and the mélange causes more confusion for the students. The education sector would certainly welcome a uniform system for identifying notebooks to enhance students' organizational abilities.

Positive reinforcement is also important for developing organizational skills in students. Establishing goals and rewarding students during the process of reaching those goals encourages them to keep doing what they do right and to stop doing what they do wrong. When students only get punished for improper behavior and not rewarded when their behavior improves, they lack motivation to keep improving. Teachers may notice particular behaviors in specific students that require specific goals and rewards in order to successfully develop the appropriate responsibility and organization skills.

Thus, student organizational notebook systems solving the aforementioned problems are desired.

SUMMARY OF THE INVENTION

The present invention is generally related to an organizational system and kit comprising organization control article such as an agenda, and several course articles linked to said organization control article, wherein said course articles comprise notebooks, file folders, envelopes, book labels, index cards, poster, planners, notebook paper, page-marker flags, and binders with indicia, such as color-coded, in order to relate to a particular academic class or subject with said control article. For example, a green notebook could relate to Science class, a light green notebook could relate Lab Class, a yellow notebook could relate to Spanish class, a red notebook could relate to English class, etc. The present invention further comprises reward planning items, such as reward schedules and marker stickers for keeping track of a student's progress towards a goal and reward.

In a first aspect of the present invention, the notebooks for right handed or left handed students are fashioned to employ different calligraphy such as first, second, third, primary penmanship quadrille, 5 mm, 7 mm, 9 mm, and regular composition lines, among others.

Another aspect of the present invention is that, as presently contemplated, each notebook will be available in different distinctive indicia, such as bright colors, with matching double-pocket folders for homework, an agenda and the like. Accordingly, the invention provides a system for assisting students to organize and thereby creating a better environment for learning and developing organizational skills. Each planner also includes a section for establishing, scheduling, and marking rewards so students and teachers may keep track of how well the student is doing and when a goal is reached.

Another aspect of the present invention is that said invention provides for improved course articles such as binders, folders, envelopes, book labels, index cards, page-marker flags, notebook paper, and reward-marker stickers in an arrangement for the purposes described that are inexpensive, dependable and fully effective in strengthening academic performance.

Another aspect of the present invention is to provide a control article, such as an agenda, wherein said control article comprises means to identify indicia with a particular subject matter, means to summarize and show long term tasks, means to prioritize tasks, means to track behavior, means to track time to perform a task and/or homework, means to illustrate a completed the task, means to establish goals, means to keep track of the progress towards a goal, and means of establishing rewards for accomplishing goals.

Another aspect of the present invention is to provide a control article, wherein said control article comprises means to identify the material need to complete a particular task of a particular subject.

Another aspect of the present invention is to provide a control article, wherein said control article comprises means to classify, encourage and provide a reward for user performance after the user completes a task related to a particular subject matter. The present disclosure provides for the use stickers with different indicia directed to the performance of the user. The stickers are divided by groups and each group represents a particular performance and is distinct from other groups in order to make the classification of user performance easier.

Another aspect of the present invention is to provide a poster related to the control article or agenda/planner, wherein said poster provides a visual aid to educators, parents and/or the students in order to provide a reminder of pending tasks or to show completed tasks. The poster comprises structure similar to the agenda in order to easily relate subjects and materials with the tasks. The teacher and/or parent will update the poster with information about the tasks related to each subject so that students may include said information in their agendas. For example, in the green space of the poster, which corresponds to the Science class, the teacher may write an assignment and indicate if the workbook for the class is required for said assignment. The teacher may also include a recommendation for the amount of time that it should take the student to finish the assignment. The poster is made bigger than the control article and is intended to be located at a place where students are able to see it and can make sure that the information on their control agenda is accurate according to the teacher or parent's instructions. Indicators and spaces in the poster are to be completed by the teacher or parent depending on the specific tasks and goals towards which the student has to work and the student must copy down the contents of the poster into the agenda.

The disclosure itself, both as to its configuration and its mode of operation will be best understood, and additional objects and advantages thereof will become apparent, by the following detailed description of a preferred embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings, which are incorporated herein, constitute part of the specifications and illustrate the preferred embodiment of the invention.

FIG. 17 shows a page of another embodiment of the organization control article wherein said page includes a behavior identifier that allows teachers and/or parents to indicate the student's behavior and compliance, and a space for additional comments.

DESCRIPTION OF THE PREFERRED EMBODIMENT

Figure 1:
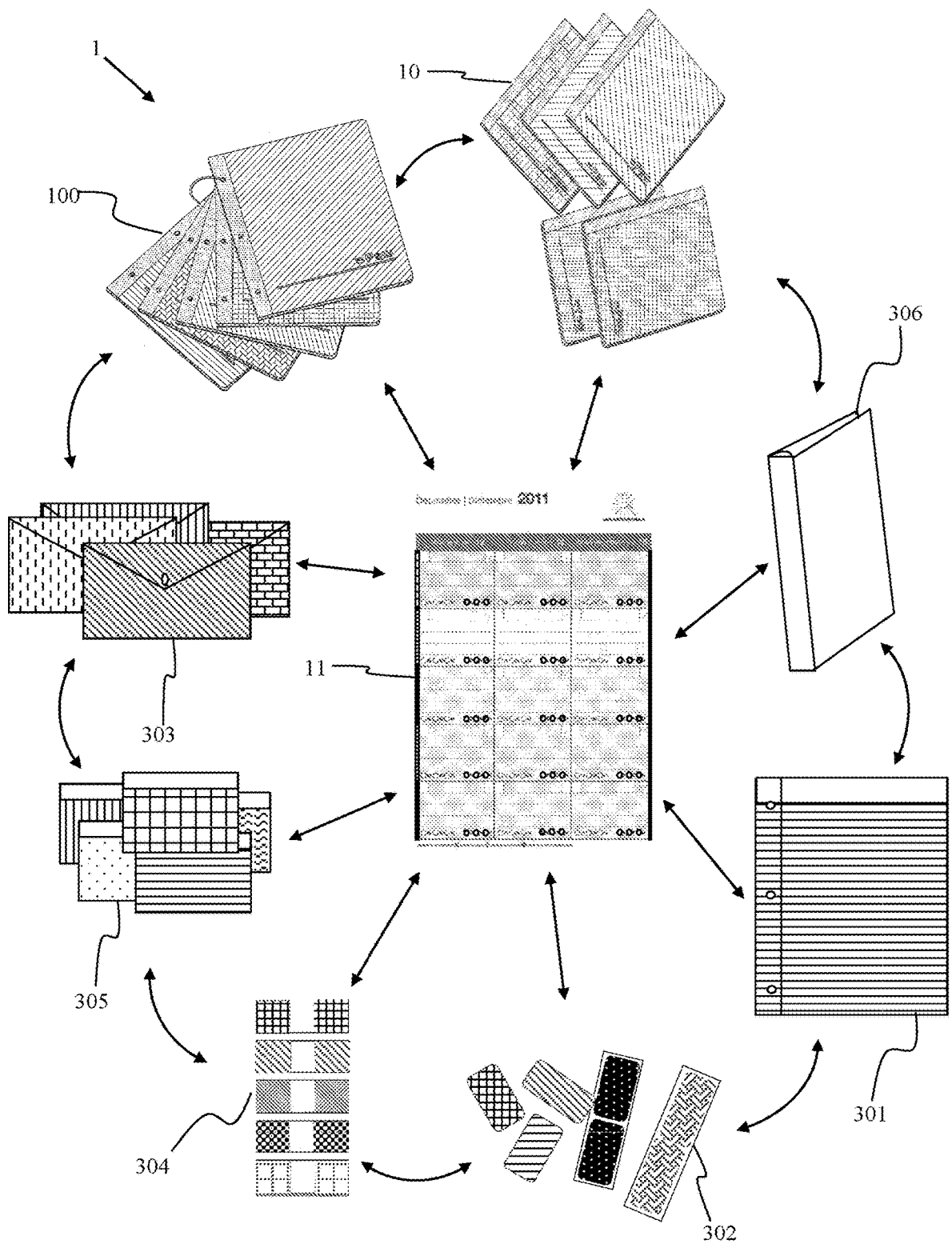
FIG. 1 shows an embodiment of the organizational system and kit including an organization control article and several course articles.

FIG. 1 discloses an embodiment of the organizational system and kit comprising an organization control article 11, such as an agenda, weekly planner or the like, and several school course articles or supplies. The course articles comprise notebooks 10, file folders 100, envelopes 303, book labels 302, index cards 305, notebook paper 301, page-marker flags/bookmarks 304 and binders 306 with indicia. The indicia assist with the identification of articles by distinguishing the same type of article from each other. For example, a first notebook and second notebook having structural similarities are distinguished from each other by comprising a first indicia, such as color or pattern design, and a second indicia, such as penmanship paper, respectively, wherein first indicia is different from the second indicia.

Further, the indicia of an article can be related to a different article having a different structure but the same indicia. For example, a notebook and a file folder may have the same color, indicating that both articles are to be used for materials of the same subject. Having different course articles with the same indicia assists the creation of groups under particular indicia. Each particular indicia could represent a particular subject matter, academic class, a case, etc. The course articles 10, 100, 301, 302, 303, 304, 305, 306 having the same indicia are further related to the organization control article 11. Each article is described in more detail below. The indicia on the course articles may further indicate a student's academic level. For example, indicia that includes faces, small spaces and bright drawings may be used for younger students, while bold fonts, more detailed spaces for notes and solid mute colors may be used for older students.

Figure 2:
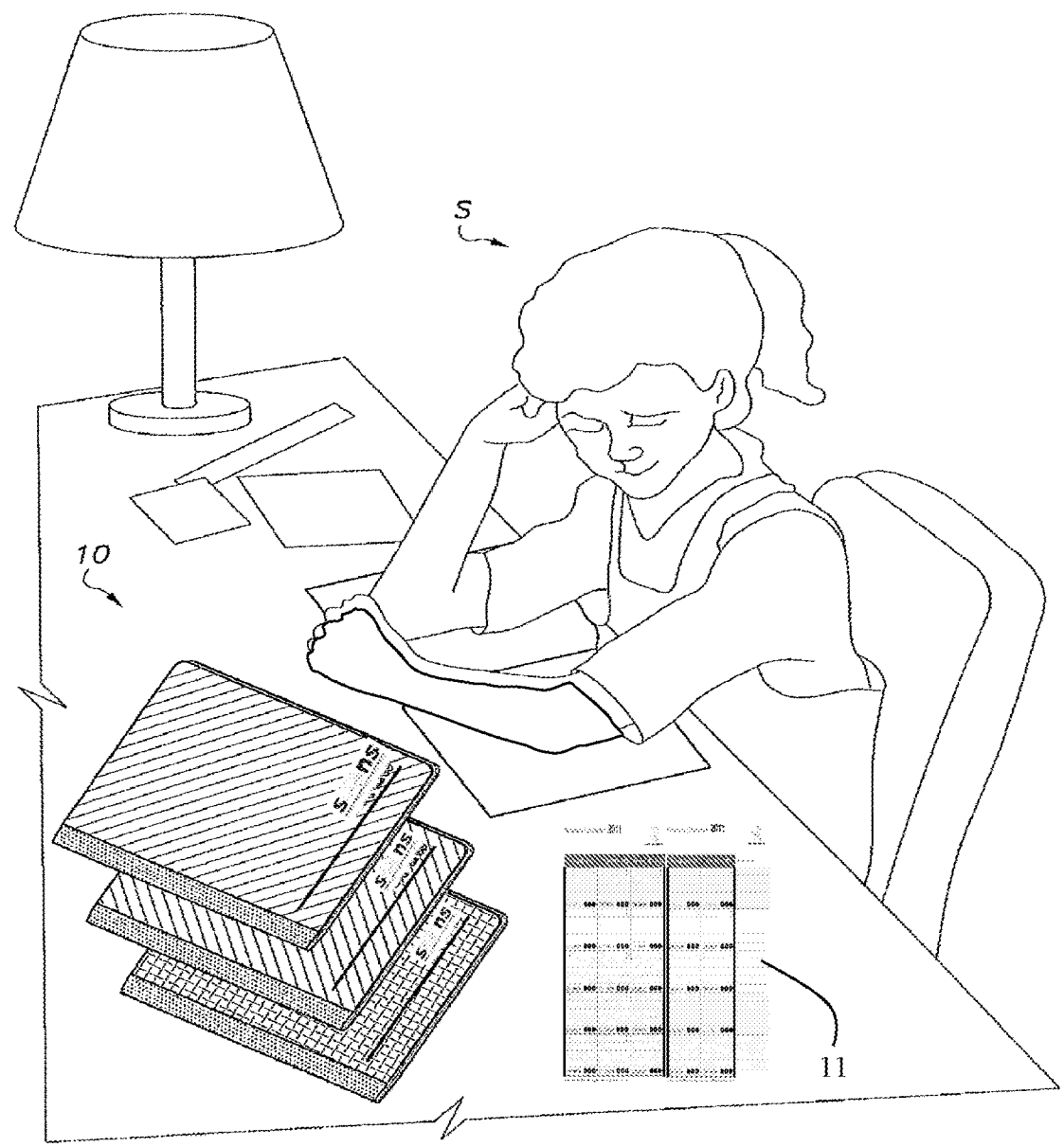
FIG. 2 is an environmental, perspective view of a student using the organizational system and kit according of the present invention.

FIG. 2 is directed to a person, such as a student S, using the organizational kit 1, including notebooks 10 and control article 11.

Figure 3:
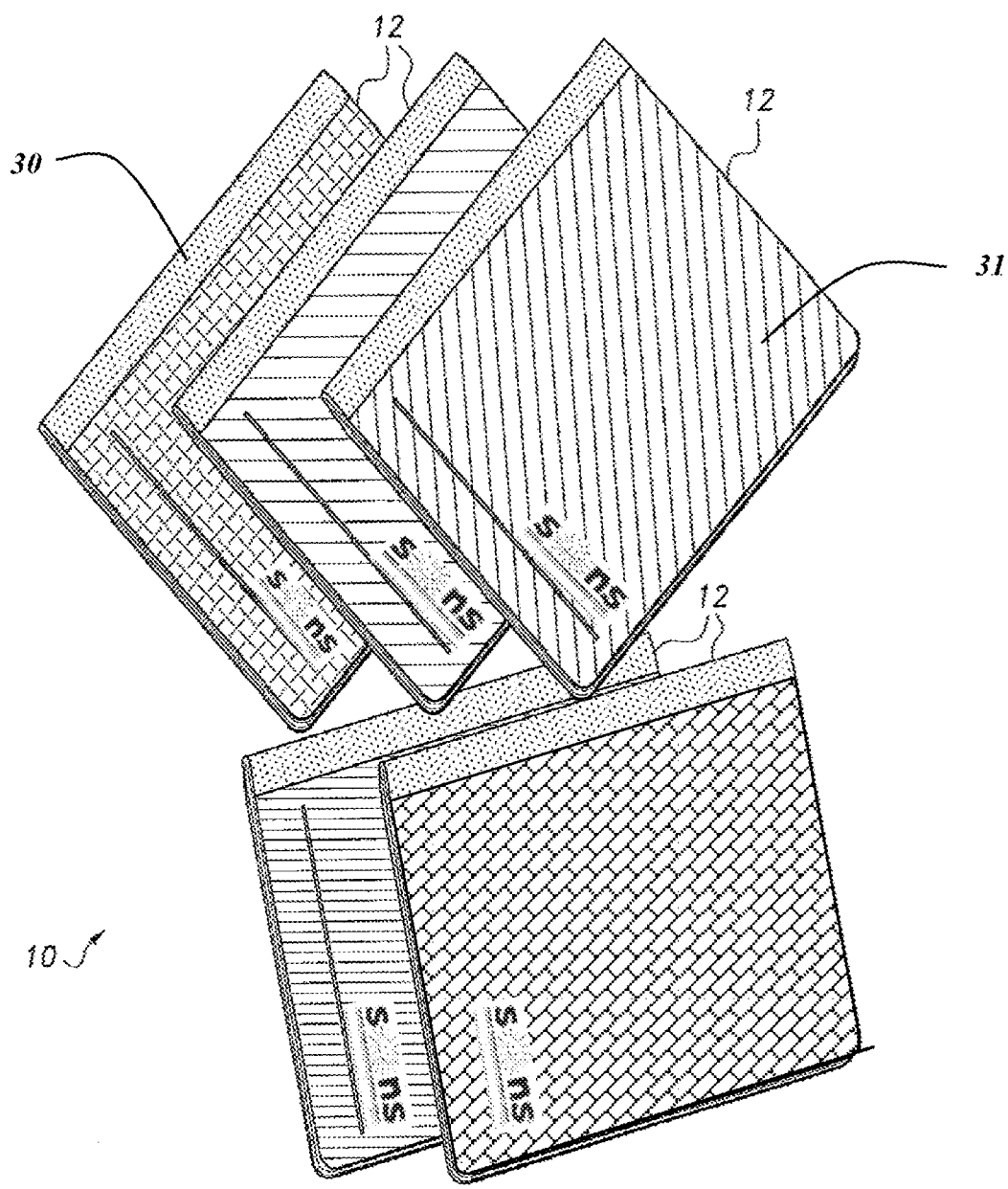
FIG. 3 is a perspective view of notebooks according to the present invention. Similar reference characters denote corresponding features consistently throughout the attached drawings.

FIG. 3 is a perspective view of student's organizational notebooks 10 according to the present invention. Each notebook 12 is part of a system comprising multiple notebooks 10. Each notebook 12 comprises distinctive indicia, such as different color, pattern design or texture, and each color represents a particular subject, as determined by the student, teacher or parent. While a preferred embodiment may use solid colors as indicia for each notebook 12, patterns and color combinations may also be used. Each notebook spine 30 could have the same indicia for all the notebooks or it could have uniform indicia, such as the same color as the notebook's cover 31 to provide easy identification of academic class or subject when it is placed inside a container, shelf, or backpack. This arrangement creates less confusion for the student. The student is more likely to associate a color with a particular class, thereby organizing school work by subject matter. Although five notebooks are shown, it should be recognized that the number of notebooks utilized would correspond to the number of classes taken by the student. Notebooks may also comprise different penmanship paper, such as 5 mm, 7 mm, and 9 mm, depending on the subject and the student's academic level.

Figure 3A:
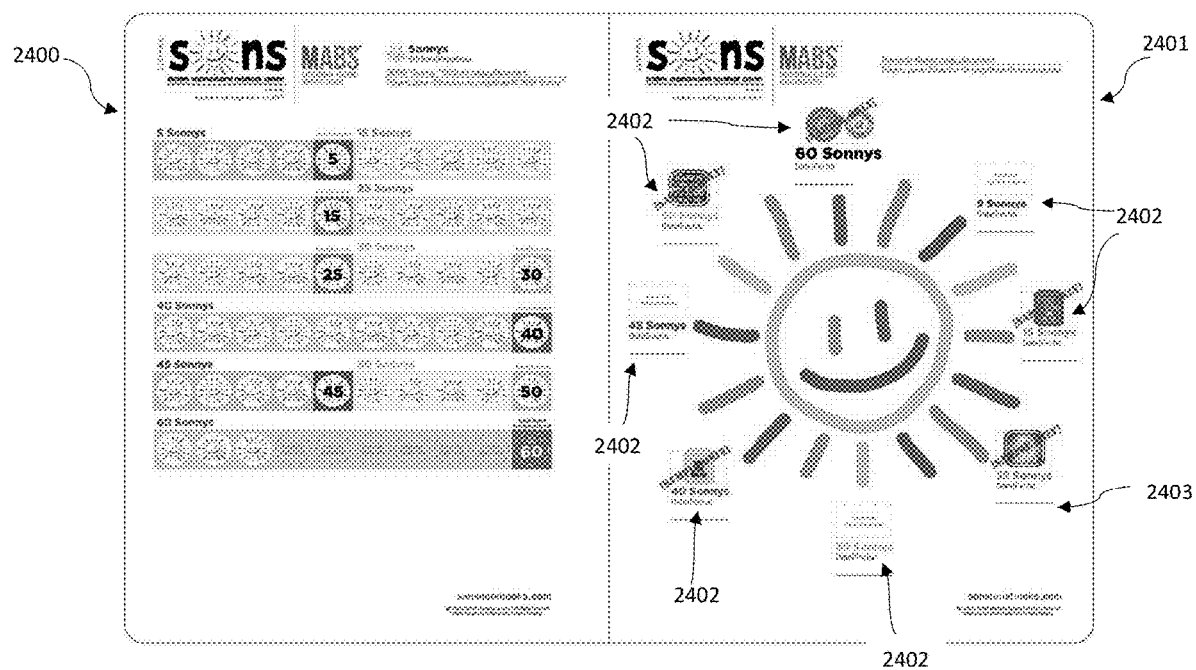
FIG. 3A shows a progress tracking and a reward tracking section with indicia for marking milestones achieved by a student.

As shown in FIG. 3A, each notebook contains a progress tracking section 2400 that is used as progress indicia for appropriate academic behavior towards a goal and reward. Using this section, a teachers and parents may determine how far into a goal or milestone, and therefore close to receiving a reward, the student is. Every time a student completes a task or assignment, a progress marker, such as a sticker, is to be placed in this section. Each notebook also contains in its inside cover a milestone/reward tracking section 2401 that contains milestone/reward indicia wherein students, parents and/or teachers can see the rewards/milestones the student has achieved and what are the upcoming rewards to achieve. Every time a student achieves a milestone and receives a reward, a milestone marker, such as a sticker, may be placed in this section. The teacher or parent will determine, based on each student's specific situation, if a progress marker, such as a sticker 2200 should be awarded and placed in his notebook. In an exemplary embodiment, the reward/milestone section comprises milestone indicia 2402 where milestone/reward markers 2201 can be placed when a student achieves a specific milestone, based on the teacher or parent's determination of what the performance of the student was. For example, every time the student participates in class, a sticker 2200 will be awarded and placed on his/her notebook, or on the progress tracking section 2400. As another example, every time a student participates in class, answers a question correctly, or turns in an assignment on time, a sticker 2200 will be awarded. The teacher or parent will determine what entitles the student to a sticker and how many stickers are required for getting a reward. This determination is made depending on each student's abilities, personality and limitations.

When the student reaches the number of stickers 2200 required for the reward, a reward/milestone marker (sticker) will be placed on the reward/milestone indicia 2402 of the notebook, encouraging the student to want to keep earning stickers in order to earn more rewards. Rewards are also determined by the parent or teacher based on the student's abilities, personality and limitations. Examples of possible rewards are not having to use the school uniform for a day, eating candy in class, choosing a movie to watch in class, and other small privileges that show the student that improving his behavior leads to benefits. In another exemplary embodiment of the present invention, rewards can be bigger every time or unknown, motivating the student work towards the goal because he wants to find out what the reward is, or he at least knows it will be even better than the previous reward. This type of rewards system associating certain activities with a sense of accomplishment and positive thinking, which lead a student to be motivated to repeat said activities. Using a rewards system further helps steer the student in the direction of doing things the appropriate way, as he/she will understand that good performance means good outcomes. In addition to progress and milestone/reward markers, a further embodiment may comprise spaces for adding date information 2403 related to the progress and the achieved milestones. This helps teachers and parents to determine how frequently or quickly a student achieves milestones.

Rewards systems are frequently used in the education of younger students. By providing a reward for a behavior that we want to incorporate into the child's behavioral repertoire, we ensure that the child repeats said behavior until it becomes habit. For example, rewards increase the student's tendency to be responsible with his/her assignments during class in an efficient manner. The same rewards system may also be used to reinforce values, such as empathy with classmates, moral behavior such as respecting other people's property, and having manners.

Figure 4:
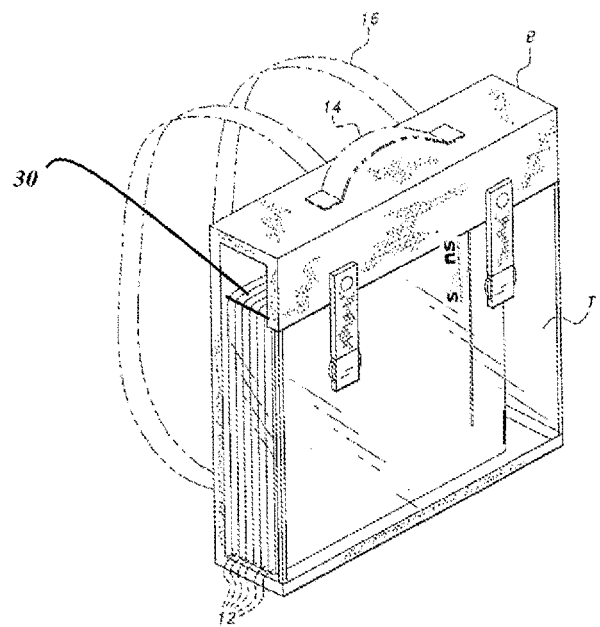
FIG. 4 represents a backpack filled with the articles of the organizational system and kit according to the present disclosure.

FIG. 4 represents a backpack or container or backpack T filled with the student's organizational notebooks 10. The notebooks 10 are placed with their spine 30 up to provide easy identification of academic class or subject. This allows the student to save time searching for the right notebook, thus improving his or her performance.

Figure 5A:
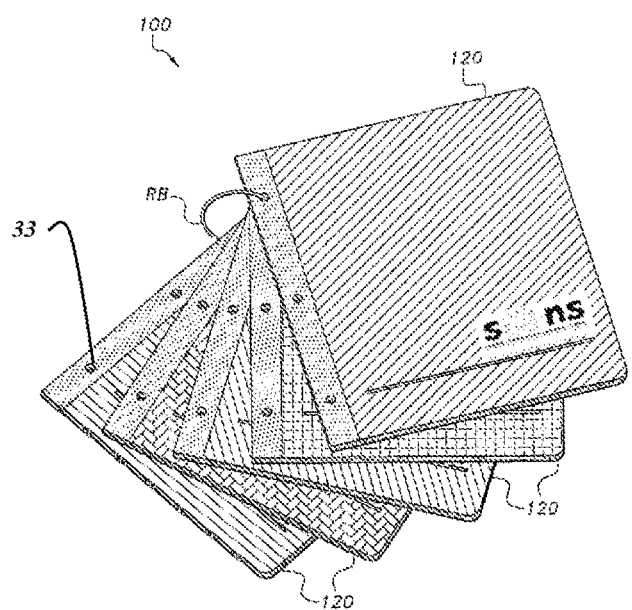
FIGS. 5A and 5B show a perspective view of the organizational system and kit's matching file folders, wherein said folders may be grouped by a binder ring or a three-ring binder.

FIG. 5A is a perspective view of the organizational system and kit matching file folders 100, wherein said folders 100 can be grouped by a single ring or a 3 ring binder. Each folder 120 is marked or comprises indicia, such as color, design pattern or texture, with all the constituents of the present invention. The folders 100 can be easily ungrouped if a professor needs to keep it to grade school work.

Figure 5B:
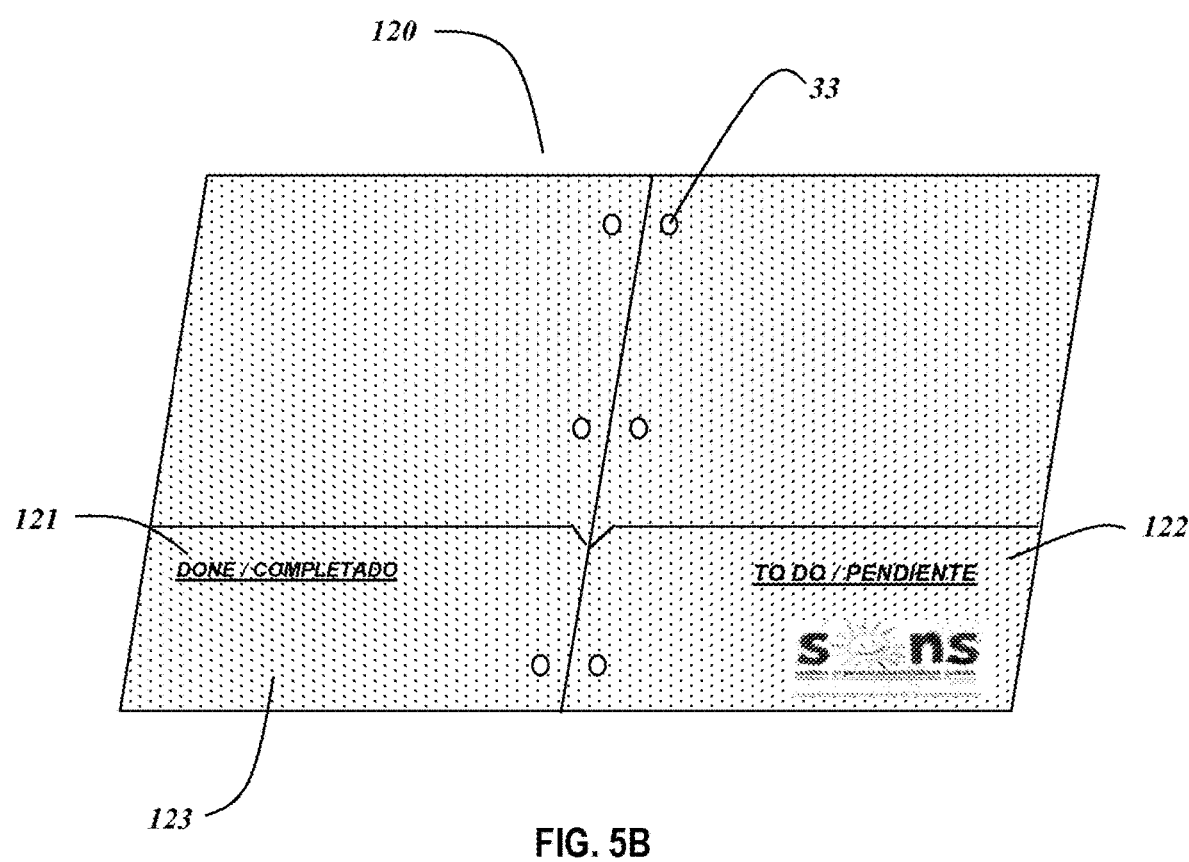

FIG. 5B is a perspective view of the organizational system and kit matching file folder 120. Said folder 120 has interior pockets 123, wherein the right pocked is labeled "To Do" 122 and the left pocked is labeled "Done" 121. The structure of the folder 120 allows the student to easily structure and organize his tasks. Based on the student's determination of which tasks are complete and which ones are still pending, the student may place the documents related to each task in the properly labeled pocket.

Figure 6:
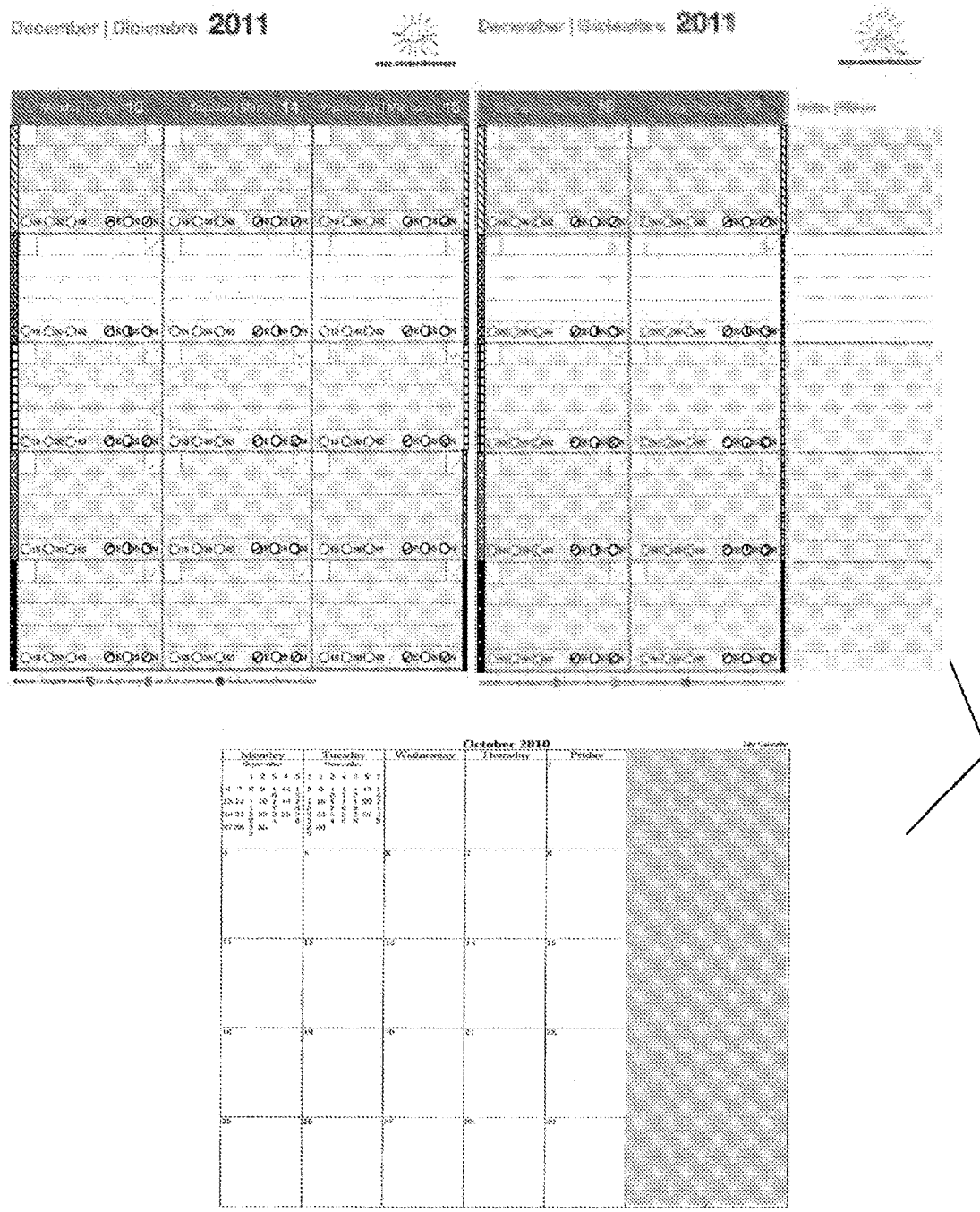
FIG. 6 is a perspective view of the organization control article wherein said control article is organized to present each particular indicia, such as color codes, matching to the corresponding course articles.

FIG. 6 is a perspective view of the organization control article 11, for example an agenda, wherein such agenda comprises a plurality of color-coded pages corresponding to an academic class or subject. A recommended color-subject combination may be provided, such as Green-Science, or the parent, teacher or student may decide which color corresponds to each class or subject.

Figure 7:
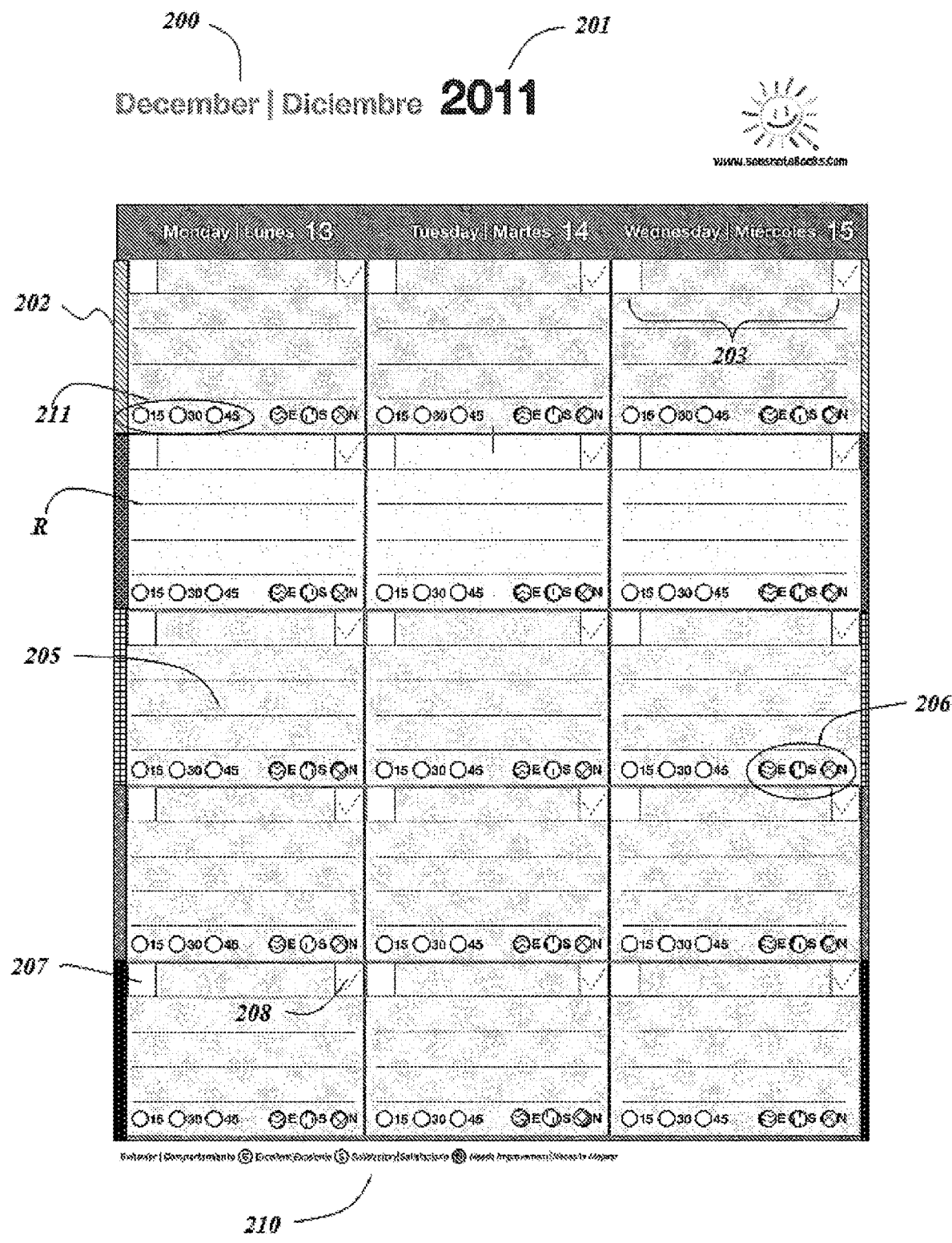
FIG. 7 is perspective view of a page of the organization control article wherein said control article is organized into subsections comprising color codes, matching to the corresponding course articles.

FIG. 7 is a perspective view of a page of the organization control article 11 dated within the current academic year 200, 201, wherein said page is organized into color codes 202, matching to the corresponding academic class or subject. The organization control article 11 may or may not have printed classes or subjects. Preferably the only academic class or subject identification method is by colors, which promotes the student to develop and improve memorization skills. One of the constituents of the organization control article 11 are two small boxes 203 located at the top corners of the specific day and class box 205 in order to promote organizational skills. The priority of each task will be determined by the teacher and the parents of the students, taking into account the student's needs. The student may also on its own establish task priorities. After the priority of each task is determined, they are recorded into the control article by writing in the left box 207 a number from one to five (1-5), wherein number one will be the highest priority level and number five will be the lowest priority level. The priority task identifier 207 can be written by the user or it may come pre-written in the box to allow the user to mark/select the priority number; always keeping in mind that the lowest number is the highest priority level. The order of priorities assigned allows for the student to better allot time for each task and to have a visual representation of how much work is necessary to complete all of the day's assignments. Further, a task completion identifier is provided. In the instant case the task completion identifier is a check box. For example, the student will check the right box 208 when he or she has completed the task.

Parents and teachers are also to make a determination as to a student's behavior during a specific period of time. The bottom left corner of the class box 205 provides a behavior section 206 with behavior identifiers wherein the parent, guardian or teacher may write a classification about the student's behavior 210, which is provided at the bottom of the page. The behavior classification system 210 may consist of letters "E", "S", and "N", which stand for "excellent", "satisfactory" and "needs improvement" respectively. This section informs anyone reading the control article what the behavior of the student is during that class, so the reader (parents or other teachers) can compare with the behavior of the student in other classes with the same teacher or at the same time period. This allows for finding factors that affect the student's behavior, and organizing and adjusting the teacher's/parent's methods to improve the student's behavior.

Figure 8:
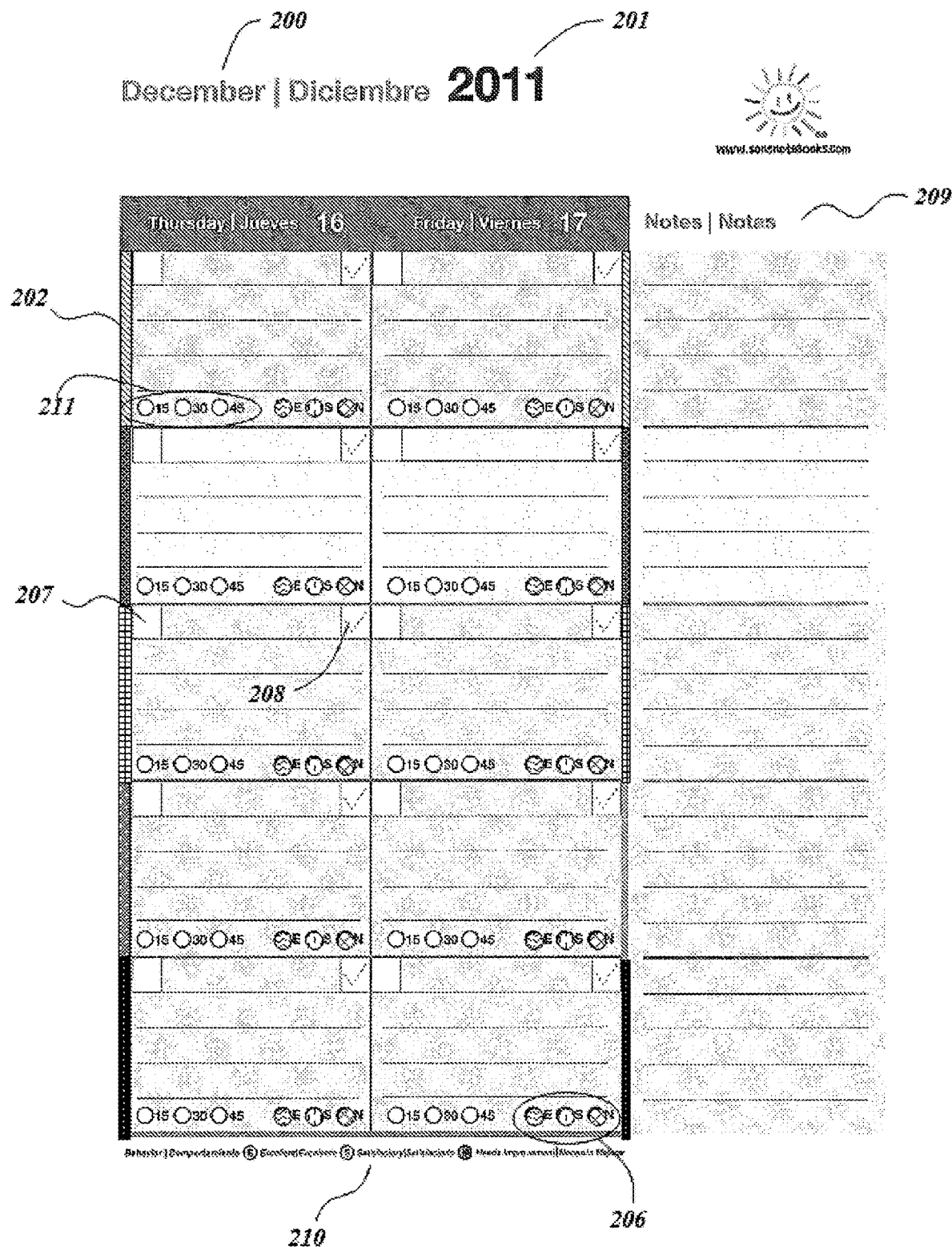
FIG. 8 is a perspective view of a page of the organization control article wherein said control article is organized into subsections comprising color codes, matching to the corresponding course articles.

FIG. 8 is a perspective view of a page of the student organizational notebook system's agenda 11 dated within the current academic year 200, 201, wherein said page is organized into color codes 202, matching to the corresponding academic class or subject. The page provides a space for notes 209 where the student, professor or parent may write important matters.

Figure 9:
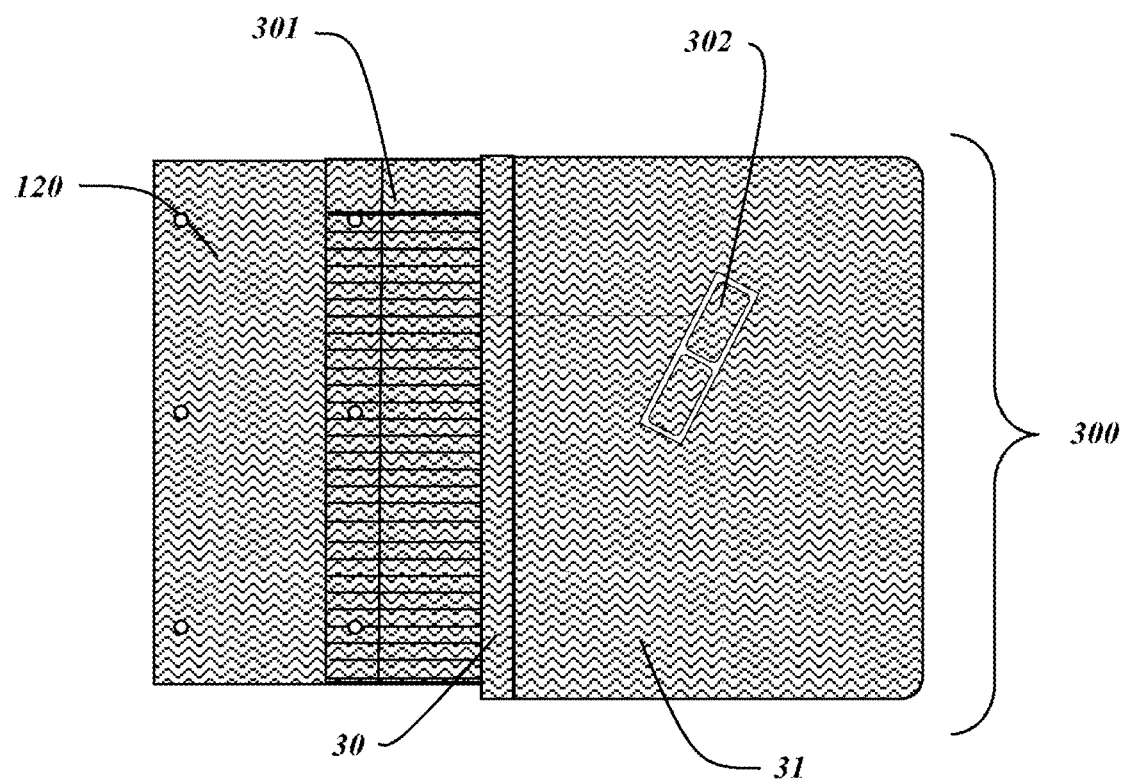
FIG. 9 is a demonstration of some of the organizational system and kit's constituents grouped together by matching colors.

FIG. 9 is a demonstration of some of the student's organizational notebook system's constituents grouped together by matching colors 300, wherein grouped constituents, as a matter of example, consist of a file folder 120, notebook paper 301, book label 302, and notebook 31. The aforementioned constituents are of the same color to help the student improve organizational, memorization and planning skills, and developing executive functions.

Figure 10:
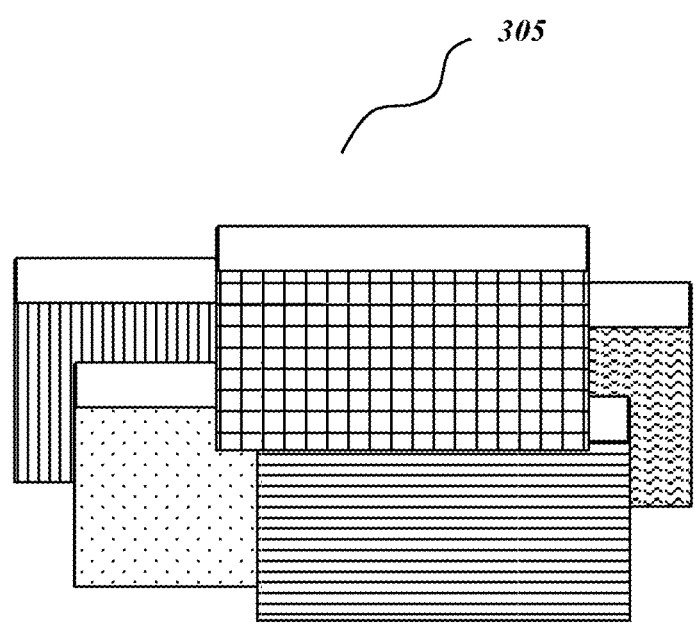
FIG. 10 is a perspective view of the organizational system and kit's color-coded index cards.

FIG. 10 is a perspective of the organizational system and kit's color-coded index cards 305, wherein said cards 305 are matched to their corresponding academic class or subject, allowing the student to improve memorization skills and quick learning.

Figure 11:
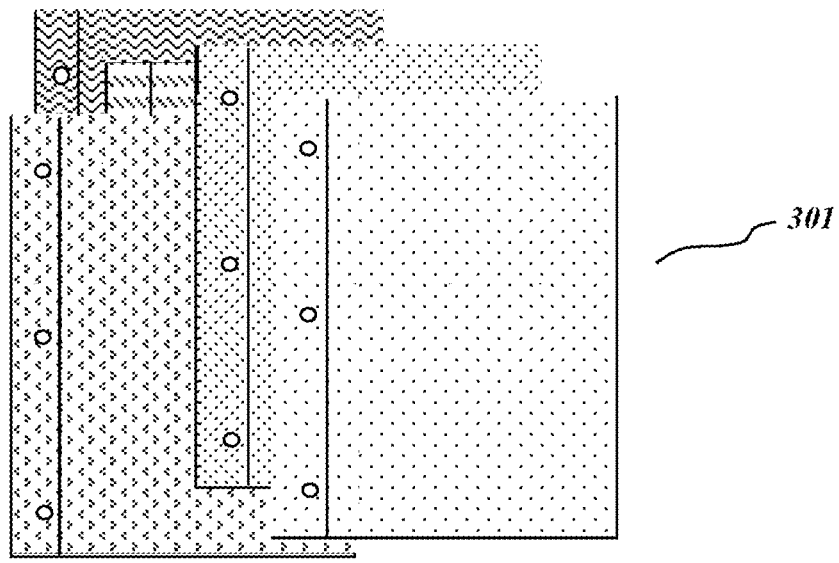
FIG. 11 is a perspective view of the organizational system and kit's color-coded notebook pages.

FIG. 11 is a perspective of the organizational system and kit's color-coded notebook papers 301, wherein said notebook papers 301 are matched to their corresponding academic class or subject. In the case a professor needs to grade school work, the student may remove notebook papers 301 from organizational system and kit ring binder 306 or any other container and place it on the student's organizational notebook system's corresponding color-coded plastic envelope 303 or file folder 120 and hand it out to the teacher.

Figure 12:
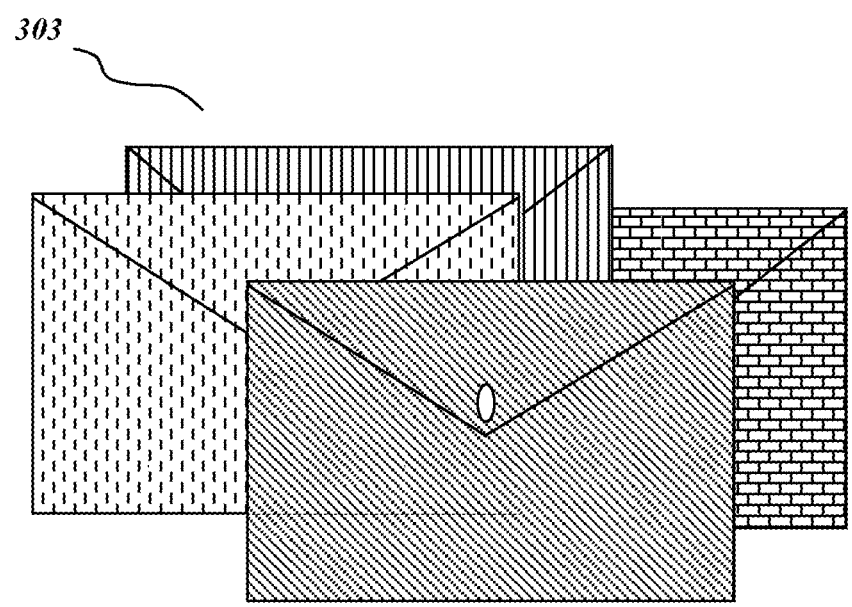
FIG. 12 is a perspective view of the organizational system and kit's color-coded plastic envelopes.

FIG. 12 is a perspective of the organizational system and kit's color-coded plastic envelopes 303, wherein said plastic envelopes 303 are matched to their corresponding academic class or subject. The student may use the plastic envelope place important class documents. Additionally, said plastic envelopes 303 may be used to save material that will not be used, graded school work that may be used as study material for exams, projects or as future reference. To improve organizational skills, items placed in the file folders 120 will then be transferred to the plastic envelopes 303.

Figure 13:
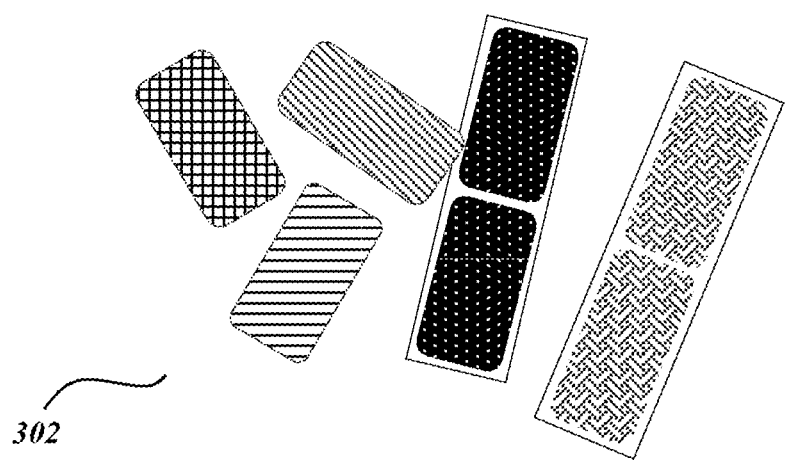
FIG. 13 is a perspective view of the organizational system and kit's color-coded book labels or tags.

FIG. 13 is a perspective of the organizational system and kit's color-coded book labels 302, wherein said book labels 302 are matched to their corresponding academic class or subject. The color-coded book labels may be placed on the corresponding academic class or subject textbook's spine or workbooks, among other school materials. Labeling textbooks or other school material helps the student improve his or her organizational skills especially because when the student has an assignment, he or she will take everything that is labeled the same color.

Figure 14:
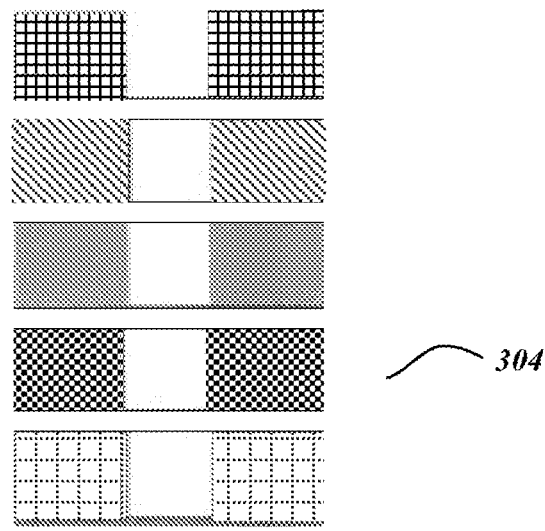
FIG. 14 is a perspective view of the organizational system and kit's color-coded page-marker flags, which may also be used as bookmarks.

FIG. 14 is a perspective of the organizational system and kit's color-coded page-marker flags 304, wherein said page-marker flags 304 are matched to their corresponding academic class or subject. The student may mark, flag or highlight important information. Color coded page-markers 304 are easy to spot and easy to write on and they stick securely and remove cleanly for no document damage.

Figure 15:
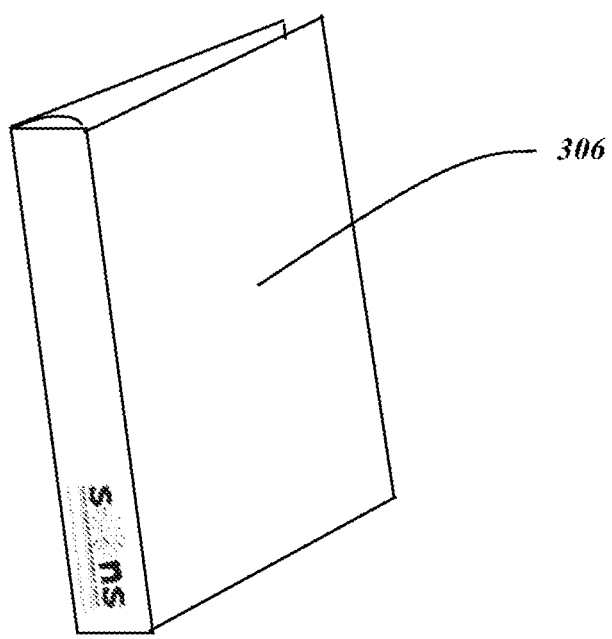
FIG. 15 is a perspective view of the organizational system and kit's color-coded three-ring binder.

FIG. 15 is a perspective of the organizational system and kit's color-coded ring binder 306, wherein said color coded ring binder 306 is matched to its corresponding academic class or subject. The ring binder 306 may hold its corresponding color-coded notebook paper 301 by means of clamps running through the holes of the notebook paper 301. The binder may also hold its corresponding color-coded file folder 120, making it easy and convenient for the student to transfer notebook paper 301 from the ring binder 306 to the matching file folder 120, thus, improving organizational skills.

Figure 16:
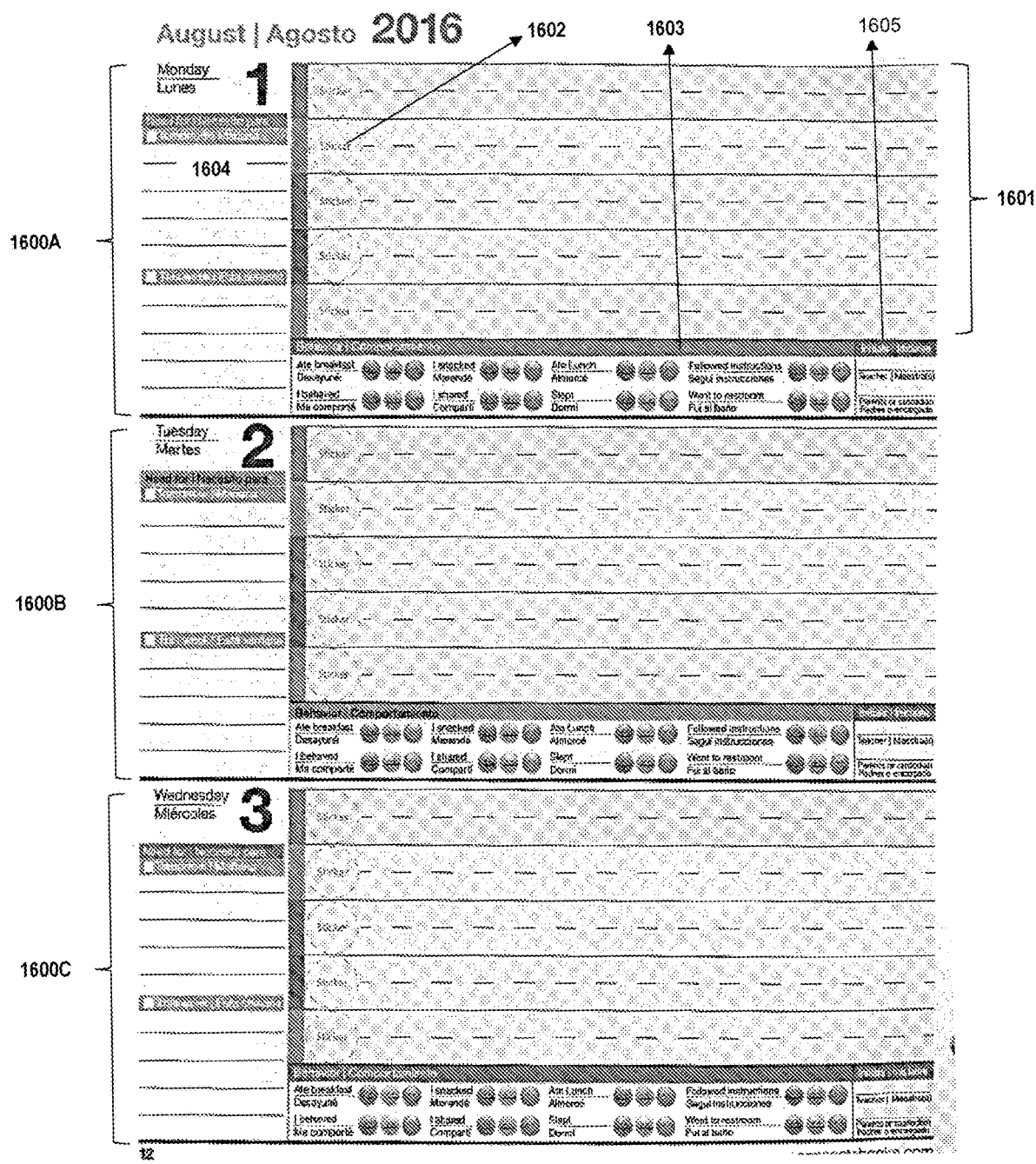
FIG. 16 shows a page of another embodiment of the organization control article wherein said page includes a behavior identifier that allows teachers and/or parents to indicate the student's behavior and compliance.
Figure 22:
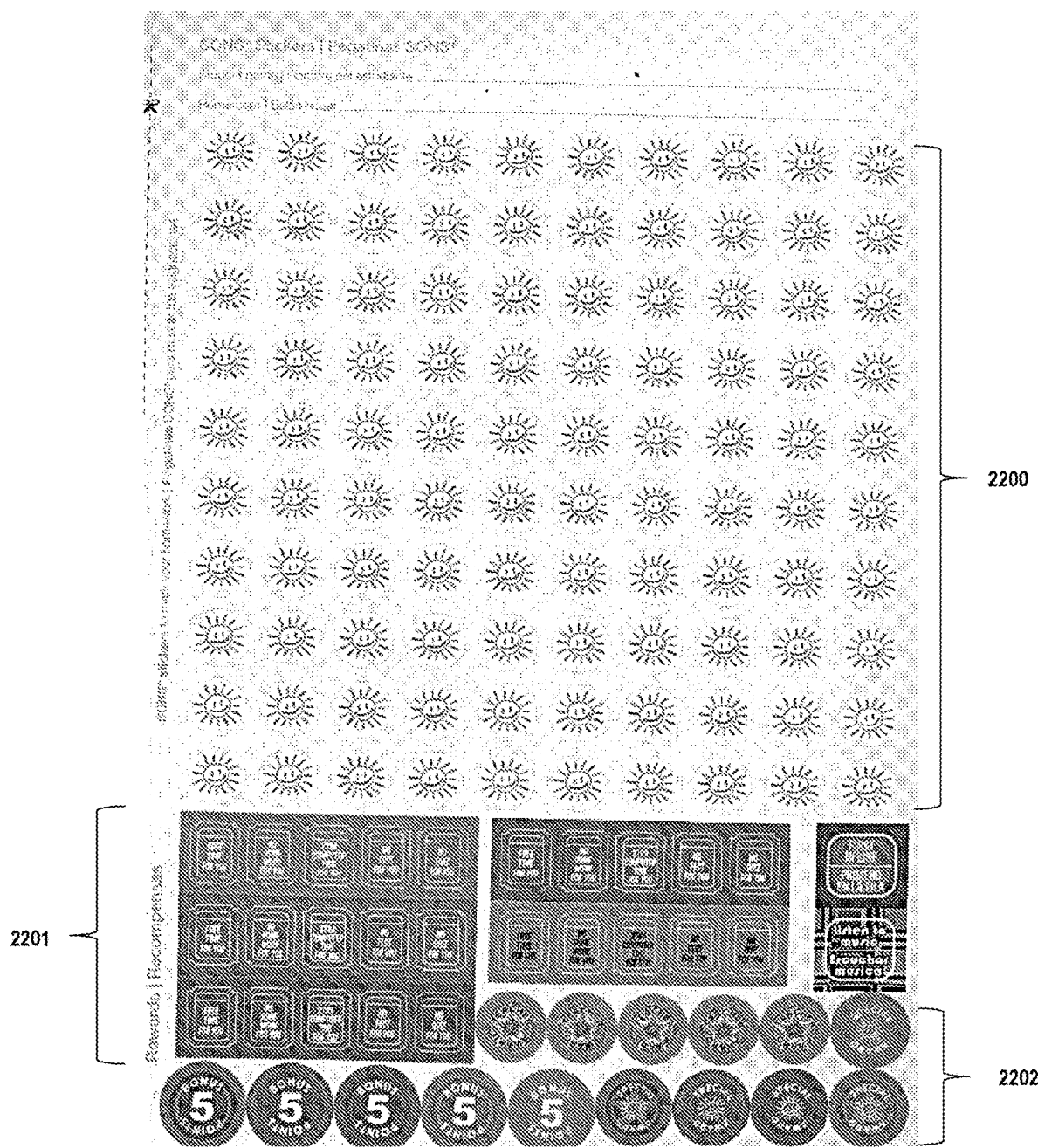
FIG. 22 shows reward elements, such as stickers, that may be used in combination with the organization control article in order to track a student's progress and compliance with assignments, and reward the student based on his/her performance.

FIG. 16 shows a page of another embodiment of the organization control article 11 wherein said page comprises a plurality of sections 1600A, 1600B, 1600C, each section corresponding to a particular school day and each section is further subdivided into one or more subsections wherein at least a first subsection 1601 comprises color-coded rows for writing down assignments, optionally with primary penmanship lines for students in early writing stages, each color-coded row corresponding to an academic subject, and each color-coded row comprising an area for placing progress markers (stickers) 1602, which helps the student in creating the habit of using a planner in order to improve organization skills. A sticker may be placed in said section whenever there is a pending assignment or when an assignment is completed. The teacher or parent may take note of the number of stickers the student has for rewarding good behavior of the student or for incentivizing the student to complete an assignment related to the particular subject. At least a second subsection 1603 comprises a behavior indicator that indicates or keeps track of certain student behavior during the school day, such as whether the student had breakfast, behaved, had a snack, engaged in sharing, had lunch, slept, followed instructions or went to the restroom during the school day. This helps parents keep track what goes on during the student's day at school. At least a third subsection 1604 comprises an area for including daily and/or weekly student needs; and at least a fourth subsection 1605 comprises an area for providing parent/custodian and/or teacher initials. It should be noted that the color-coded rows perform the function of associating a color with a particular academic subject. As such, every time a student sees a particular color on the organization control article 11, it will associate said color with a particular academic subject. It should further be noted that the organization control article 11 may also include a page comprising a plurality of progress markers (stickers) as shown in FIG. 22 that are separated into one or more groups 2200, 2201, 2202.

Figure 17:
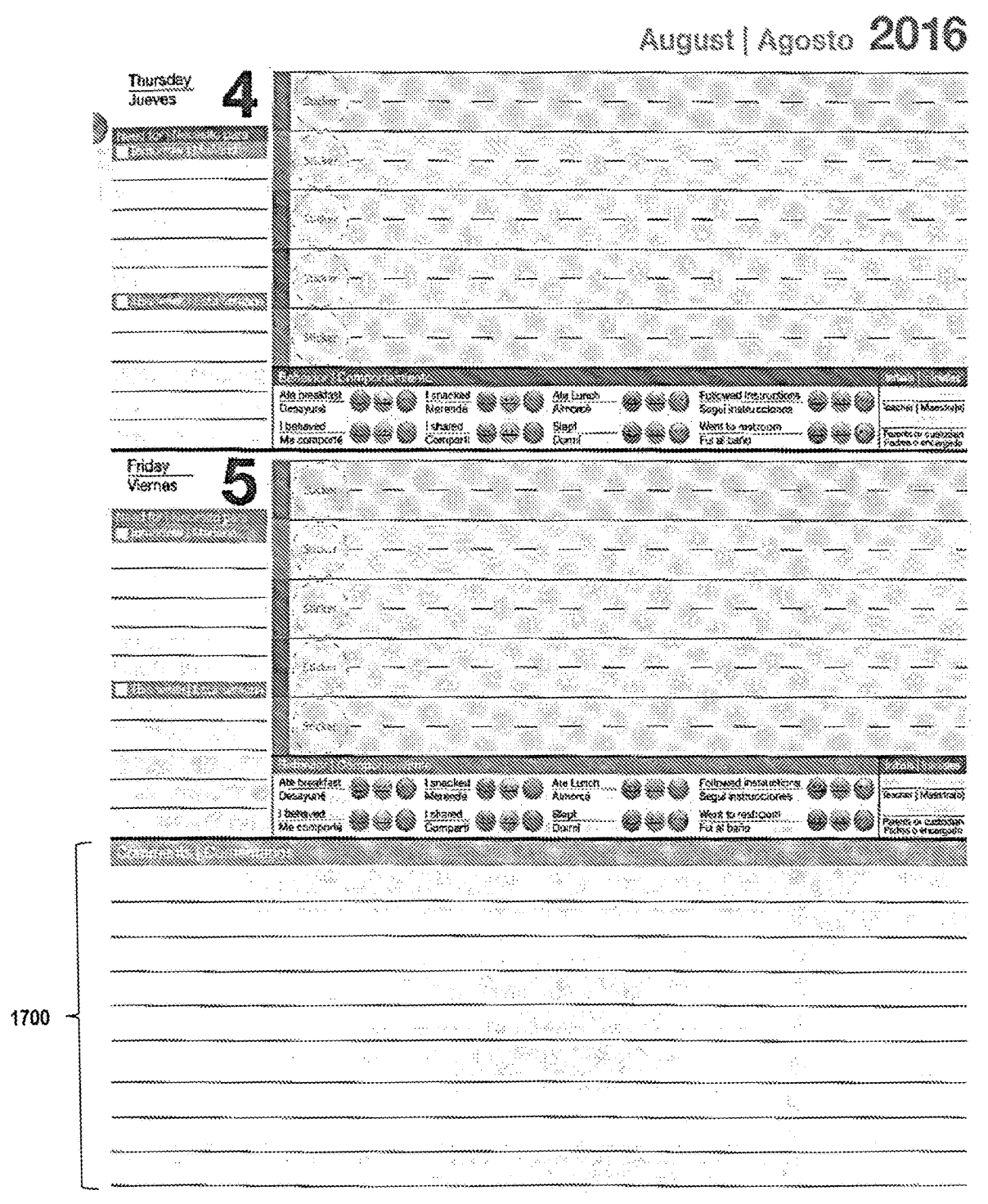

Rewards may be determined by parents or teachers depending on a student's needs, abilities and personality. Since the rewards section comprises spaces for rewards stickers, it allows for an evaluation of the student's improvement or decline. For example, an empty rewards section may mean the student does not care for the rewards offered or that he has difficulty reaching the necessary goals. This visual representation of a student's tendencies allows teacher and parents to adjust their methods accordingly. Lastly, FIG. 17 shows a page of the embodiment shown on FIG. 16, wherein at least one of the plurality of sections comprises a ruled or blank area for providing comments 1700.

Figure 18:
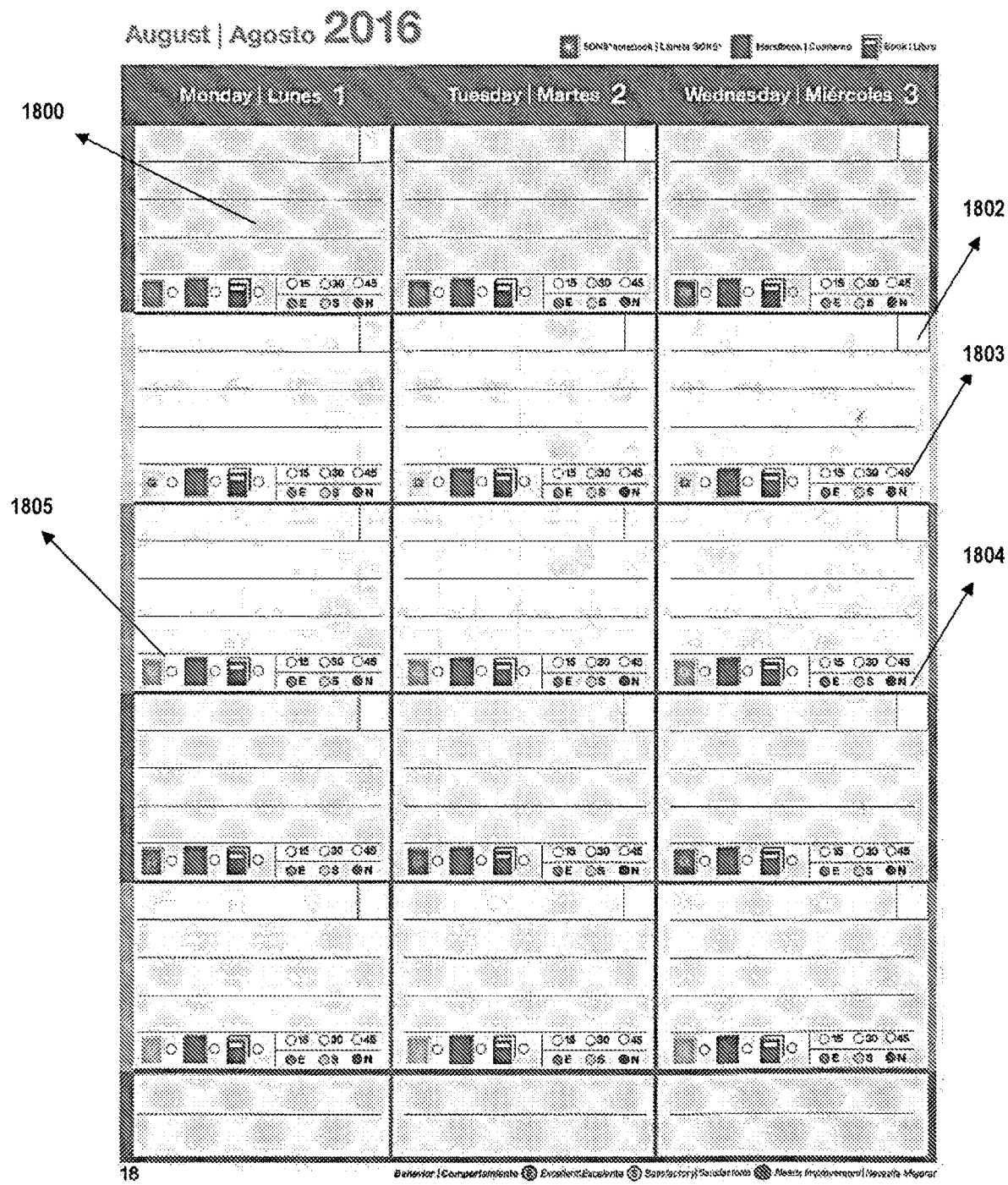
FIG. 18 shows a page of another embodiment of the organization control article wherein said page comprises at least one section to make notes related to assignments, identifiers for the required materials for said assignment, performance identifiers and the time allotted for said assignment.
Figure 19:
FIG. 19 shows a page of another embodiment of the organization control article wherein said page comprises at least one section to make notes related to assignments, identifiers for the required materials for said assignment, performance identifiers, the time allotted for said assignment, and a section for additional notes or comments.

FIG. 18 shows a page of another embodiment of the organization control article 11. In particular, the page of the organization control article 11 comprises a plurality of rows and columns, wherein each column corresponds to a particular school day and each row is color-coded and corresponds to a particular subject. As such, each subject is consistently associated with a particular color throughout the pages of the organization control article 11. Furthermore, the point at which a row and column intersect with each other forms an intersection area 1800 that represents the specific school day allotted or dedicated to a particular subject. Additionally, for each different school day, the intersection area 1800 further comprises a box 1802 for marking the priority of an assignment for a particular subject as previously explained with respect to FIG. 7. Moreover, the intersection area 1800 further comprises a section for selecting or providing a time estimate 1803, in which the student or teacher estimates the time required to complete an assignment. For example, the student or teacher can estimate whether the assignment will take between 15, 30 or 45 minutes to complete. Furthermore, for each school day, the intersection area 1800 further comprises a section with behavior identifiers 1804 which are used to classify a student's behavior. For example, the behavior identifiers may be the letters "E", "S", and "N", which correspond to daily behavior that is either "Excellent", "Satisfactory", or "Needs Improvement" respectively, as discussed with respect to FIG. 7. The student may use said behavior identifiers as a visual aid in planning to reach goals and receive rewards. For example, if the student notices a specific teacher often considers his behavior "needing improvement" and it is affecting his ability to reach a goal and receive a reward, he may be encouraged to change his behavior in order to receive a better evaluation, reinforcing positive behavior. Students may also want to compare their control articles and encourage each other to improve. Lastly, for each school day, the intersection area 1800 further comprises at least one section having at least one material task identifier 1805 that allows the user to identify the text or materials required to complete that particular school day's assignment, wherein the material task identifier includes, but is not limited to, indicia representing a book, a handbook or a color notebook that may be required to complete that school day's assignment. Thus, the indicia helps in quickly identifying the text or materials needed to complete a particular subject's assignment and serves as a reminder of the materials needed to complete the assignment. In other embodiments, said indicia allows the student to know what the assigned task is. For example, indicia representing a book indicates that the assignment is reading a chapter; indicia representing a workbook indicates that the assignment involves practice exercises. This gives the student a visual representation of what the pending work entails, so he can organize his time accordingly. This also helps parents and teachers understand if a student is being assigned to do similar tasks too often and the effect, if any, that it has on the student's performance. It should be noted that each intersection area 1800 shown in FIG. 18 is in the shape of a square, but it may be designed in any other shape. FIG. 19 shows the right page of the embodiment shown on FIG. 18, wherein one of the columns compromises a ruled or blank area for providing notes for each particular subject 1900.

Figure 20:
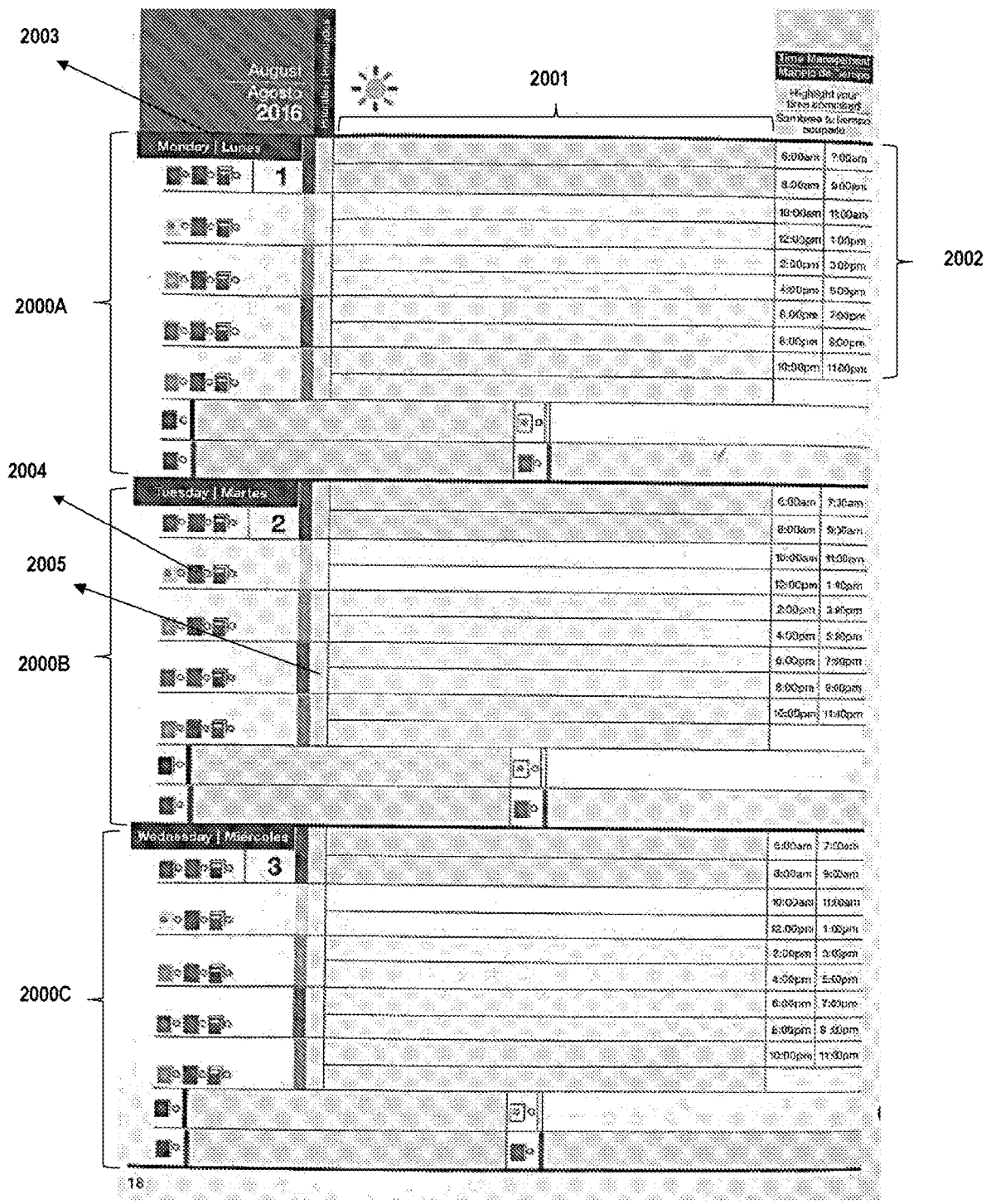
FIG. 20 shows a page of another embodiment of the organization control article wherein said page comprises at least one section to make notes related to assignments, identifiers for the required materials for said assignment, and a section for managing the time used on each assignment.
Figure 21:
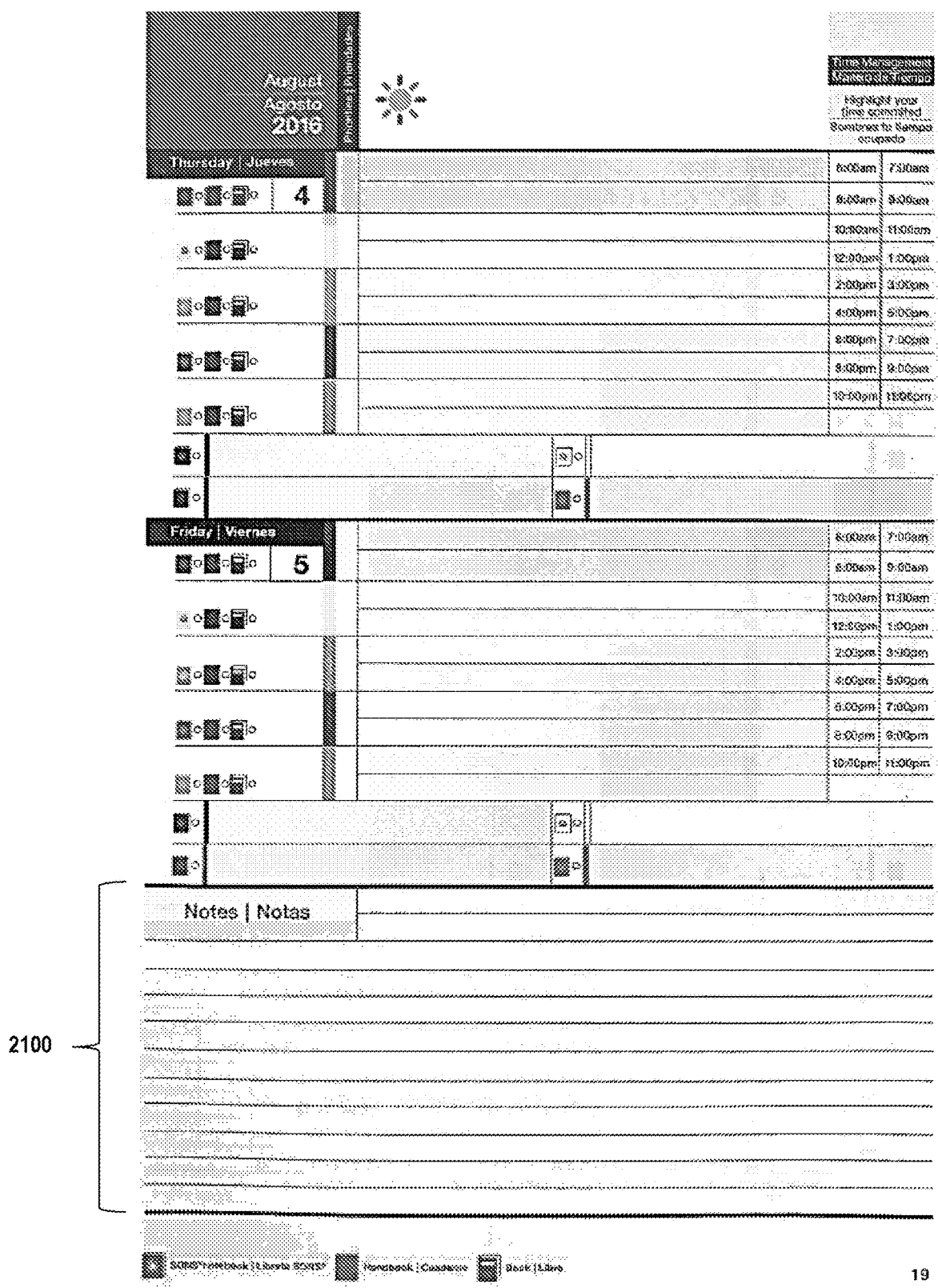
FIG. 21 shows a page of another embodiment of the organization control article wherein said page comprises at least one section to make notes related to assignments, identifiers for the required materials for said assignment, a section for managing the time used on each assignment, and a section for additional comments.

FIG. 20 shows the left page of another embodiment of the organization control article 11 wherein said page comprises a plurality of sections 2000A, 2000B, 2000C each section corresponding to a particular school day and each section further subdivided into one or more subsections wherein at least a first subsection 2001 comprises color-coded rows corresponding to an academic subject, said rows comprising at least one area 2005 for providing an order of priority of a particular subject, wherein the first row corresponds to the subject of highest priority and the last row corresponds to the academic subject of lowest priority; at least a second subsection 2002 comprises a time management area for indicating the time committed to a particular subject; and at least a third subsection 2003 comprises an area that includes at least one material task identifier 2004 that allows the user to identify the text or materials required to complete that particular school day's assignment, wherein the material task identifier includes, but is not limited to, indicia representing a book, a handbook or a notebook that may be required to complete that school day's assignment, as explained with respect to FIG. 18. Lastly, FIG. 21 shows the right page of the embodiment shown on FIG. 20, wherein at least one of the plurality of sections comprises a ruled or blank area for providing notes 2100.

Figure 23:
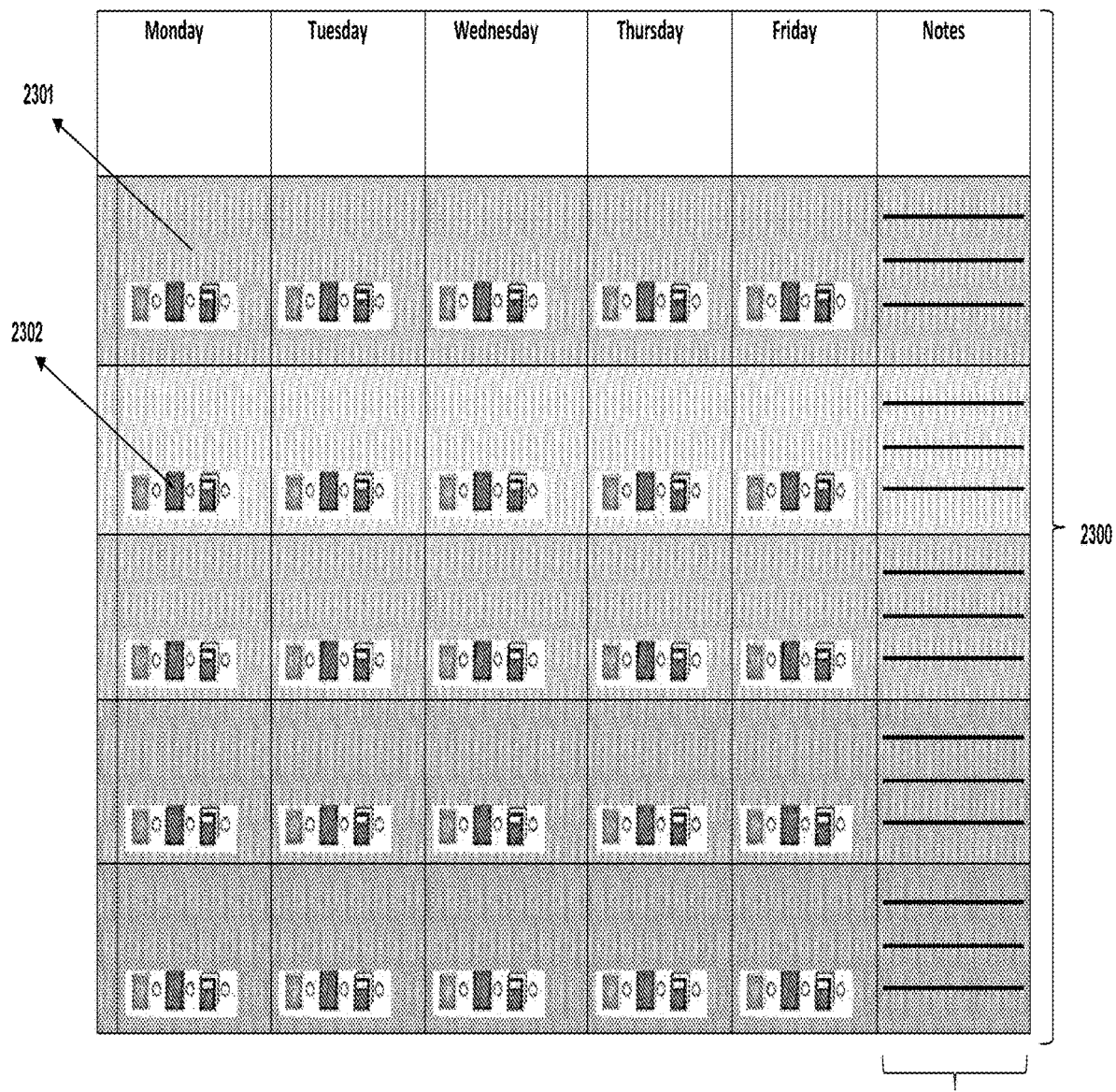
FIG. 23 shows a poster calendar associated with the organization control article, which may be used by a teacher or parent in order to plan coursework for each week and the student may use a reference to include the information in his/her agenda/planner.

FIG. 23 is a perspective view of a poster calendar 2300 that may be used in association with the organization control article 11 and serves as a visual aid for parents, teachers, and students. The poster calendar can have any size and comprises a material that is reusable in the sense that it allows the user to write on the poster calendar with a marker and erase what was written later on if necessary. The poster calendar further comprises a plurality of rows and columns, wherein each column corresponds to a particular school day and each row is color-coded and corresponds to a particular subject. As such, each subject is consistently associated with a particular color. Moreover, the point at which a row and column intersect with each other forms an intersection area 2301 that represents the specific school day allotted or dedicated to a particular subject. Furthermore, the intersection area 2301 comprises at least one section having at least one material task identifier 2302 that allows the user to identify the text or materials required to complete that particular school day's assignment, wherein the material task identifier includes, but is not limited to, indicia representing a book, a handbook or a notebook that may be required to complete that school day's assignment, as explained with respect to FIG. 18. Lastly, the poster calendar optionally includes at least one of the columns of the poster calendar includes a ruled or blank area for providing notes 2303 for each particular subject.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A method for visually tracking and motivating a student's behavior and academic achievements by providing rewards to said student comprising the steps of:

establishing one or more student milestones;

establishing a required number of milestones for giving a student one of a plurality of rewards;

identifying said one or more student milestones by placing milestone indicia on one or more course articles;

identifying a task or activity to be completed by a student by placing progress indicia on said one or more course articles;

marking the student's progress towards a reward by placing one or more progress markers with progress date information over said progress indicia every time the student completes the task or activity;

marking achievement of said one or more student milestones by placing one or more milestone markers with milestone date information over said milestone indicia every time a milestone is achieved by said student;

giving said student said reward every time said required number of milestones are achieved by said student;

wherein said one or more course articles comprise colors or patterns for identifying a course;

wherein a control article comprises one or more control sections for receiving notes from the student, each one of said control sections comprising colors or patterns that notify the student that the control section corresponds to a particular course and that notes related to said particular course must be entered in that control section;

wherein all course articles and all control sections having the same color or pattern correspond to the same course;

wherein achieving said required number of milestones entitles said student to one of said plurality of rewards;

wherein said milestone markers comprise information about said plurality of rewards; and wherein each reward in said plurality of rewards is different from each other.

2. The method of claim 1, wherein said control article is an agenda or poster.

3. The method of claim 1, wherein said milestone indicia comprises text describing a milestone.

4. The method of claim 1, wherein said milestone indicia comprises a number indicating the number of milestones achieved.

5. The method of claim 1, wherein said milestone indicia comprises a drawing.

6. The method of claim 1, wherein said milestone markers and said progress markers are stickers.

7. The method of claim 1, wherein said reward comprises granting said student permission to perform an activity of his election, wherein said activity is selected by said student from a predetermined list of activities.

8. The method of claim 1, wherein said course articles are one of the following:
notebook, folder, envelopes or stickers.

9. A visual aiding academic course organization and rewards system comprising:
a control article;
wherein said control article comprises one or more control sections;
wherein each control section further comprises colors or patterns to notify a student that the control section corresponds to a particular course and that notes related to said particular course must be entered in that control section;
one or more academic course articles;
wherein each of said one or more course articles comprises progress indicia, milestone indicia, and colors or patterns for identifying a course; and
wherein all course articles and all control sections having the same color or pattern correspond to the same course,
thus allowing the student to determine which control section to use for each course article.

10. The academic course organizational system of claim 9, wherein said control article is an agenda or a poster.

11. The academic course organizational system of claim 9, wherein said course articles are one of the following: notebook, folder, envelope or sticker.

12. The academic course organizational system of claim 9, wherein at least one control section is configured to allow for tracking student milestones and rewards related to said milestones.

13. The academic course organizational system of claim 9, wherein at least one control section is configured to allow for tracking student behavior.

14. The academic course organizational system of claim 9, wherein at least one control section is configured to allow for tracking tasks related to a course.

15. The academic course organizational system of claim 9, wherein at least one control section is configured to allow for providing comments or notes.

\* \* \* \* \*